United States Patent Office 3,314,987
Patented Apr. 18, 1967

3,314,987
CATALYTIC REDUCTION OF FLUORINATED ESTERS
Leslie C. Case, 14 Lockeland Road, Winchester, Mass. 01890, and Tsoung-Yuan Yan, Paulsboro, N.J. (6-B Morris Ct. Apts., Gloucester, N.J. 08030)
No Drawing. Filed Dec. 15, 1965, Ser. No. 514,145
3 Claims. (Cl. 260—484)

This invention relates to the discovery of a new and useful method of catalytically reducing fluorinated esters to their corresponding hydroxy compounds having novel properties and usefulness as chemical intermediates, and to certain of the compounds thus produced.

The catalytic hydrogenation of alkyl esters of fluorocarbon acids ($C_nF_{2n+1}COOR$) using a copper-chromium oxide catalyst containing a trace of combined barium oxide at elevated temperatures and pressure to yield the 1,1-dihydroperfluoro alcohols is disclosed in British patent specification 760,769 (Nov. 7, 1956). It has been found much to our surprise that if the diester of a perfluorinated diacid is hydrogenated under the disclosed conditions little or no reduction occurs. The catalyst becomes inactive quickly, and this loss of activity results in recovery of the starting diester and undesirable decomposition products.

The catalytic hydrogenation of fluorinated diesters to the corresponding diols at elevated temperatures and pressures using a copper-chromium oxide catalyst and a large amount of added barium oxide or calcium oxide as a promoter has been described in U.S. Patent 2,911,444. However, this process depends on the use of very large amounts of added promoter, and results in complete reduction of the diester to the corresponding diol. Furthermore, the use of such large amounts of promoter is somewhat costly, leads to difficulties in obtaining good agitation, and complicates the recovery step. The preparation of unsymmetrical fluorinated hydroxy esters by a simple reduction technique has not ben described in the art, and these compounds are therefore unknown with the exception of the lowest member of the series, $$HOCH_2CF_2COOR$$

which is prepared by a non-reductive procedure.

The method of catalytic reduction of the present invention can be used to prepare a variety of reduction products depending on the specific process and starting materials employed. Specifically, the instant process can be used to prepare fluorinated alcohols from simple fluorinated esters, and fluorinated diols from fluorinated diesters and fluorinated ketoesters. The fluorinated alcohols and diols are useful and valuable as chemical intermediates. Many of these alcohols and diols are articles of commerce, and are presently being prepared by methods more expensive than the catalytic method disclosed and claimed herein.

The method of catalytic reduction claimed herein can also be used to prepare various novel partially reduced compounds from fluorinated diesters, ketoesters, and other fluorinated difunctional compounds. The fluorinated diesters having the formula $ROOC(CF_2)_nCOOR$ where R is a straight-chain or branched lower alkyl radical having from 1 to 6 carbon atoms, and $n$ is 2, 3, or 4, may be reduced in good yield to the hydroxy esters having the formula $HOCH_2(CF_2)_nCOOR$. These hydroxy esters have utility as chemical intermediates. In particular, they can be converted into lactones and polyesters by the intra- and inter-molecular elimination of alcohol, respectively. The lactones themselves are reactive chemical intermediates. The polyesters are crystalline, and chemically and thermally stable, and are useful as hydraulic fluids and insulating oils.

The first member of this series, $HOCH_2CF_2COOR$, and its corresponding acid have already been described by Raasch (U.S. 2,452,791). As is usual, the higher members of the series possess properties different from those of the lowest homolog. The terminal hydroxyl group in the higher members is less reactive toward substitution. The higher members and their derivatives are more hydrophobic and more oleophobic. The linear polyesters of the higher members have substantially different physical properties from that of the lowest member. Finally, the members of the series with $n$ equals to 2 and 3 form lactones rather readily, whereas no lactone can be formed from the initial member of the series.

Other types of partially reduced compounds may be produced using our catalytic reduction technique. The fluorinated ketoesters having the general formula $$CF_3(CF_2)_nCOCH_2COOR$$

where $n$ has a value of 0, 1, 2, 3, 4, 5, or 6, and R is a linear or branched-chain lower alkyl radical, may be reduced either to the hydroxy ester, $$CF_3(CF_2)_nCHOHCH_2COOR$$

or to the hydroxy ketone, $CF_3(CF_2)_nCOCH_2CH_2OH$, as well as to the diol. All of these compounds have utility as chemical intermediates.

The novel reduction claimed herein consists of the hydrogenation of fluorinated esters of hydrogen pressures in excess of 4000 p.s.i. over a copper-chromite-type hydrogentaion catalyst. It is essential to use a large ratio of catalyst to ester, and to use either a solvent or a purified ester, in order to obtain good yields in a reasonable length of time. Temperatures of from 50 to 300° C. have been found useful in this reduction. We have found it necessary to employ pressures in excess of 4000 p.s.i. Even at this pressure, reductions are frequently not satisfactory, and pressures of at least 8000 p.s.i. are required for good results. Many reductions are conveniently carried out at pressures in excess of 12,000 p.s.i., and in some cases, pressures in excess of 16,000 p.s.i. are desirable.

We have also found that large amounts of catalyst are required in order to facilitate this reaction. At least 1 gram of catalyst per 5 grams of ester is necessary, and usually at least 1 gram of catalyst per 2 grams of ester is required for smooth operation, and a ratio of about 1 gram per gram is frequently beneficial. Thus, the amount of catalyst employed will advisably range from at least about 20% to more than 100% by weight of the weight of the ester to be reduced. Generally, not more than 300% by weight of catalyst in this ratio is required.

We have found that a substantial amount of solvent is required when a technically pure grade of ester is to be reduced. As much as 1 gram of solvent per gram of ester may be required, and at least 0.1 gram of solvent per gram of ester is generally used. However, if the ester is carefully purified prior to reduction, a lesser amount of solvent is required. We have found that ethanol is a preferred solvent for this reaction, but that other suitable inert solvents such as other alcohols, ethers and hydrocarbons may also be employed.

The catalyst employed in this reaction may be any of the various known copper-chromium oxide catalysts, or modifications thereof. In general, these catalysts are very complex in structure, and it is not possible to express their constitution in a simple, rigorous fashion. For simplicity, they can be considered to be a mixture of $CuCr_2O_4$ and $BaCr_2O_4$. We have used primarily, as a matter of convenience, the barium-promoted copper-chromium oxide prepared according to the procedure described by Lazier and Arnold (Org. Syntheses, II, p. 142, J. Wiley, N.Y., 1943). However, the catalyst prepared according to Adkins (Reactions of Hydrogen with rganic Compounds Over Copper-Chromium Oxide and ickel Catalysts, p. 12, U. of Wisconsin Press, Madison, 937) is equally useful. The preparation of one of these atalysts is specifically illustrated in the first example. oth of these catalysts contain about 10% by weight of ombined barium oxide, possibly in the form of the hromite. Commercially available copper-chromium oxide catalysts, containing up to about 10–15% of combined barium oxide, such as Cu0401P, Cu1800P, and Cu1106P are also useful. It should be especially noted hat free oxides of barium and calcium are not essential nd are generally not present during the conditions of ur process, and that if these elements are present, they re present in chemically combined form in the catalyst matrix. This is obvious, since the catalysts useful in our rocess are frequently treated with acetic acid during reparation, this treatment being sufficient to remove free lkaline earth oxides.

It has been found that our process generally leads to mixture of partial and fully reduced products, when fluorinated ester contains 2 or more functional groups ontaining the C=O bond, unless the reduction is driven o completion by severe reaction conditions or extended eaction times. Thus, it is clear that the partial reduction products are intermediates in the production of the ully reduced products, and furthermore, the partial reduction products are desorbed in considerable quantity rom the catalyst surface previous to the subsequent reduction step. This description of partial reduction products is quite infrequent in catalytic reduction, it usually appening that an incompletely reduced mixture consists lmost completely of starting material which has not yet een converted, together with a portion of completely reduced product. Thus, the occurrence of this desorption n the present process is totally unexpected. Apparently, ome unusual reaction path or relationship between chemical reaction rate and physical absorption and desorption ates is present in the instant process.

As illustration, diethyl perfluorosuccinate reduced at 000 p.s.i. and 250° C., using 1.5 ml. of ethanol per ml. f ester and 1 g. of catalyst per ml. of ester, gives good ields of unsymmetrical hydroxy ester in one to two hours eaction time However, in six hours the unsymmetrical ntermediate has almost completely been converted to ully reduced glycol, so that the yield is 3.9% of hydroxy ster and 83.6% of diol in this time. At 8,000 p.s.i. the naximum yields of hydroxy ester are obtained at about ½ to 1 hour reaction time, and only a trace of hydroxy ster remains after four hours. Thus, although the actual ength of time required depends on pressure and other eaction conditions, good yields of unsymmetrical partial eduction products are obtained in from about ½ to 4 ours, and completely reduced products are obtained at eaction times in excess of about 4 hours. It should be mphasized that the partially reduced products are obained at an intermediate stage of reaction, under conditions which generally lead to complete reduction if continued for a long enough time. In general, optimum ield of the partial reduction products is obtained when rom about 50% to 150% of the hydrogen, based on heoretical conversion to the partial reduction product, as reacted. Stated in another way, the optimum yield of partial reduction product is obtained when at least bout 10% and less than about 90% of the hydrogen required for complete reduction has been reacted, and frequently the amount of hydrogen reacted is from about 25% up to about 75% of that required for complete reaction, for best results. The partial reductions accomplished by our process are particularly characteristic in hat we obtain at least about as much partial reduction product by weight as fully reduced product.

The following examples are presented to illustrate the nvention:

*Example 1*

Barium-promoted copper-chromium oxide is prepared according to the method of Lazier and Arnold (Org. Syntheses, II, J. Wiley, New York, 1943, page 142). A mixture of 26 g. of barium nitrate, 800 cc. of distilled water, and 218 g. of copper nitrate trihydrate is prepared at 70° C. Then a mixture of 126 g. of ammonium dichromate, 600 cc. of distilled water and 150 cc. of 28% aqueous ammonia is slowly added, with stirring, to the nitrate solution. The precipitate is collected, pressed, and dried at 110° C. The dried precipitate is then heated for one hour at 350–450° C. The ignition residue is then pulverized, and washed twice with 1.2 liters of 10 percent acetic acid, and then 4 times with 1.2 liters of distilled water. The residue is collected, dried at 110° C., and ground to a fine black powder, which is stored under nitrogen.

Ethyl trifluoroacetate is reduced to trifluoroethanol using the above catalyst. A mixture of 2 grams ethyl trifluoroacetate, 3 ml. absolute ethanol, and 2 grams of the catalyst was added to a 20 ml. 316 stainless steel testtube reactor. A bare "Alnico" magnet, ¼" diameter and 1" length was also added. The reactor was sealed, purged with hydrogen and then pressured to 16,000 p.s.i. with hydrogen. The reactor was then heated to 175° C., with magnetic stirring, for 3 hours, the pressure being maintained at 16,000 p.s.i. The stirring was then stopped, the reactor cooled and opened. The contents were then removed and centrifuged to separate the solid from the liquid, and the liquid mixture analyzed by gas chromatography. The stationary phase for this analysis was alkyl phenol-ethylene oxide adduct on 35–80 mesh crushed firebrick, and the column temperature was 150° C. The analysis gave 95% yield of trifluoroethanol, 5% unconverted ester, and no indication of low-boiling products from degradative side reactions.

*Example 2*

This example illustrates the catalytic reduction of ethyl trifluoroacetate at lower hydrogen pressures. The identical procedure was employed, except that the pressure was 8500 p.s.i. In this case, the analysis was 25% yield of trifluoroethanol and 75% unconverted ester. Additional runs were made at 4000 and 5000 p.s.i., the other conditions remaining unchanged, and no detectable reduction was obtained.

*Example 3*

This example illustrates the catalytic reduction of purified ethyl trifluoroacetate. The same conditions as Example 1 were used, except that no solvent was employed, and that the ester had been distilled through a 36" column packed with glass helices, after drying over calcium hydride. The thus purified ester was absolutely pure as analysed by gas chromatographic techniques. The yield of trifluoroethanol was about 10%, and a quantity of low-boiling degradation products was present.

*Example 4*

This example illustrates the catalytic reduction of diethyl tetrafluorosuccinate to 2,2,3,3-tetrafluorobutanediol. The same conditions as Example 1 were used, except that the ester was diethyl tetrafluorosuccinate. The analysis showed a 99% yield of the diol and a trace of the partial reduction product, ethyl hydroxytetrafluorobutyrate.

*Example 5*

This example illustrates the catalytic reduction of diethyl tetrafluorosuccinate to the diol, using an increased ratio of catalyst and a lower hydrogen pressure. The same conditions as Example 1 were used except that the charge consisted of 1 gram of diethyl tetrafluorosuccinate, 5 ml. of absolute ethanol and 3 grams of catalyst. The hydrogen pressure was 8000 p.s.i. The yield of diol was 97%, and 3% of unreacted ester was recovered.

*Example 6*

This example illustrates the catalytic reduction of diethyl tetrafluorosuccinate at still lower pressures. The same conditions as Example 5 were used except that the hydrogen pressure was 6000 p.s.i. The yield of diol was 7%, the yield of ethyl hydroxytetrafluorobutyrate was 11%, and 82% of the diester was recovered unchanged.

*Example 7*

This example illustrates the catalytic reduction of diethyl tetrafluorosuccinate to give a good yield of partial reduction product. The same conditions as Example 1 were employed, except that the pressure was 9000 p.s.i. and the temperature 210° C. The yield of diol was 17%, the yield of ethyl hydroxytetrafluorobutyrate was 58%, and 25% of the starting ester was recovered. The hydroxy ester was characterized by a vapor retention time intermediate between that of the diester and the diol, and by hydroxy and carbonyl bands in the IR spectrum.

*Example 8*

This example illustrates the catalytic reduction of diethyl hexafluoroglutarate. The same conditions as Example 1 were used except that the ester was diethyl hexafluoroglutarate and the temperature was 250° C. The yield of hexafluoropentanediol was 10%, that of ethyl hydroxyhexafluorovalerate 12%, and 78% of the diester was recovered unchanged.

*Example 9*

This example illustrates the catalytic reduction of ethyl trifluoroacetoacetate. The same conditions as Example 1 were used except that the ester was ethyl trifluoroacetoreduction product. The partial reduction product was identified as the hydroxy ester, ethyl beta-hydroxy-gamma-trifluorobutyrate, using IR spectroscopy.

*Example 10*

Example 4 was repeated using the catalyst of Adkins (Reactions of Hydrogen With Organic Compounds Over Copper-Chromium Oxide and Nickel Catalysts, p. 12, U. of Wisconsin Press, Madison, 1937). The result was very similar to that of Example 4.

*Example 11*

Example 4 was repeated using the commercially available catalyst Cu 1106 P, which contains 40% combined copper oxide, 47% combined chromium oxide and 10% combined barium oxide as analyzed. The result is again very similar to that of Example 4.

*Example 12*

The copper chromite-catalyzed, high-pressure hydrogenation of diethyl hexafluoroglutarate was attempted following the procedure for the hydrogenation of alkyl esters of monobasic fluorocarbon acids as disclosed in British Patent 760,769. A pressure vessel was charged with 148 grams of diethyl hexafluoroglutarate, 29.5 grams of copper chromite catalyst containing 10 percent of combined barium oxide (Cu0401P), and hydrogen to 220 p.s.i. pressure. The vessel was heated to 200° C. for 8 hours, with stirring, and the contents discharged. After filtering off the catalyst, the only remaining materials were unreacted starting material and undesirable low-boiling by-products.

We claim:
1. The process for catalytically reducing perfluorinated diesters having the general formula $ROOC(CF_2)_nCOOR$, wherein R is a lower alkyl radical, and $n$ is a positive integer having a value of from 2 to 4, inclusive, which process comprises reacting said perfluorinated diester with hydrogen at pressures of from about 8000 to more than 16,000 p.s.i. and temperatures of from about 50–300° C., in the presence of from 20% to 300% by weight, based on the weight of the perfluorinated diester, of a copper-chromium oxide catalyst essentially free of uncombined alkaline earth oxide.

2. The process of claim 1 wherein the resulting product consists essentially of a mixture of reduction products selected from the group consisting of a hydroxy ester having the formula $HOCH_2(CF_2)_nCOOR$, and a diol having the formula $HOCH_2(CF_2)_nCH_2OH$, wherein R is a lower alkyl radical, and $n$ is a positive integer having a value of from 2 to 4, inclusive, and wherein the hydrogen reacted is from about 25% up to about 75% of that theoretically required for complete reduction.

3. The process for catalytically reducing perfluoro-keto-esters having the general formula $$CF_3(CF_2)_nCOCH_2COOR$$

wherein R is a lower alkyl radical, and $n$ is an integer having a value of from 0 to 6, inclusive, which process comprises reacting said perfluoro-keto-ester with hydrogen at pressures of from about 8000 p.s.i. to more than 16,000 p.s.i. and temperatures of from about 50–300° C., in the presence of from 20% to 300% by weight, based on the weight of the perfluoro-keto-ester, of a copper-chrominum oxide catalyst essentially free of uncombined alkaline earth oxide.

References Cited by the Examiner

UNITED STATES PATENTS

| | | | |
|---|---|---|---|
| 2,452,791 | 11/1948 | Raasch | 260—484 |
| 2,666,797 | 1/1954 | Husted et al. | 260—633 |
| 2,911,444 | 11/1959 | Baranauckas | 260—633 |

OTHER REFERENCES

Adkins et al.: J. Am. Chem. Soc., vol. 70 (1948), pp. 3121–3125.

LORRAINE A. WEINBERGER, *Primary Examiner.*

A. HALLUIN, *Assistant Examiner.*